(No Model.)

W. A. BOLE.
METHOD OF COUPLING PIPES.

No. 331,940. Patented Dec. 8, 1885.

WITNESSES:
J. Snowden Bell.
C. M. Clarke.

INVENTOR.
William A. Bole,
BY George H. Christy
ATTORNEY.

UNITED STATES PATENT OFFICE.

WILLIAM A. BOLE, OF PITTSBURG, PENNSYLVANIA, ASSIGNOR OF ONE-HALF TO RALPH BAGALEY, OF SAME PLACE.

METHOD OF COUPLING PIPES.

SPECIFICATION forming part of Letters Patent No. 331,940, dated December 8, 1885.

Application filed January 17, 1885. Serial No. 153,132. (No model.)

*To all whom it may concern:*

Be it known that I, WILLIAM A. BOLE, a citizen of the United States, residing at Pittsburg, in the county of Allegheny and State of Pennsylvania, have invented or discovered a certain new and useful Improvement in Method of Coupling Pipes, of which improvement the following is a specification.

Figure 1:
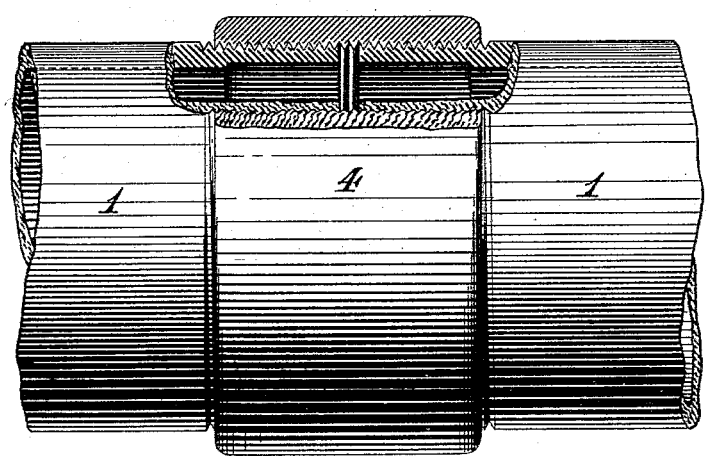
Figure 2:
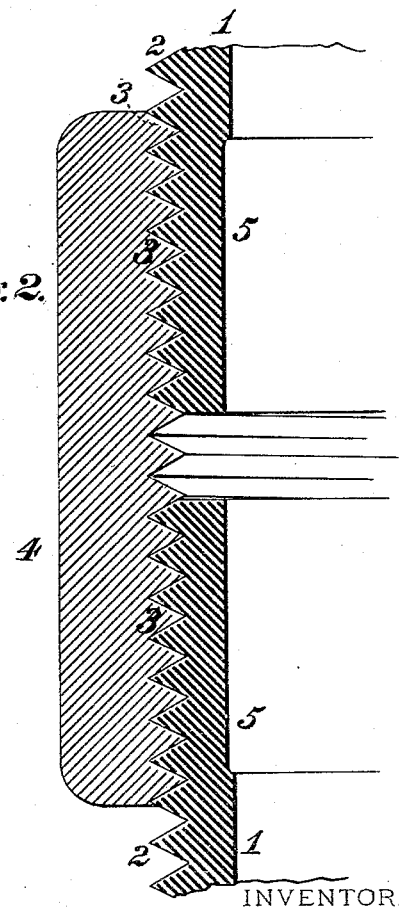

In the accompanying drawings, which make part of this specification, Figure 1 is a side view, partly in longitudinal central section, through a pipe-coupling illustrating the application of my invention; Fig. 2, a similar half-section, on an enlarged scale; and Fig. 3 a similar half-section on a corresponding scale through a coupling of the ordinary construction.

The object of my invention is to enable the adjacent ends of the several sections of a line of metal pipes or tubes to be securely and tightly connected together in such manner as to effectually prevent leakage or looseness at the joints of the line without necessitating the employment of packing or involving the existence of undue or irregular strains in the pipe-sections or their connections.

To this end my invention, generally stated, consists in a novel method of connecting sections of pipe by first screwing their externally-threaded ends into engagement with an internally-threaded socket, and thereafter forcing the helical surfaces of the pipe-sections into close contact with those of the socket by expanding the threads of the former into the space between the thread-surfaces of the latter by the application of internal pressure.

The improvement claimed is hereinafter more fully set forth.

Figure 3:
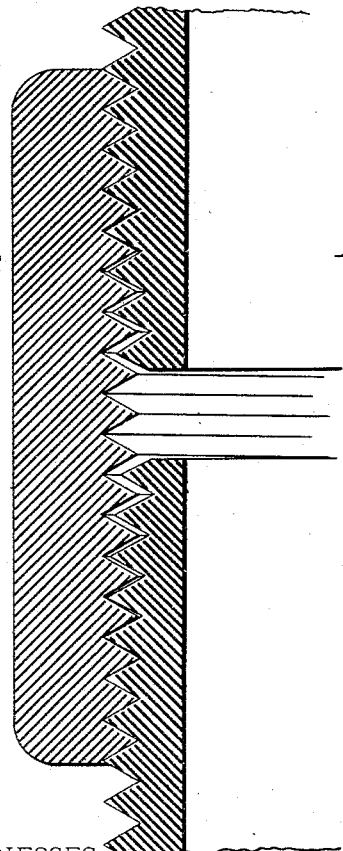

In pipe-couplings of the ordinary type the screw-threads of the pipe-sections are cut slightly tapering toward the ends of the pipes, and when screwed into the socket engage the same closely only for a limited portion of their length nearest the ends of the socket, as indicated in Fig. 3. It will be obvious that such imperfect juncture cannot be perfected by screwing the pipe more tightly into the socket, and that the effort so to do involves to a greater or less degree the straining or stripping of the threads. The fact that the pipe-sections, particularly when of comparatively large diameter, are frequently "out of round"—that is to say, are not of truly cylindrical form—is an additional cause of the failure to obtain close and uniform contact of their threaded surfaces with those of their sockets, even in couplings heretofore employed, in which tapering threads on the pipe-sections are screwed into similarly-tapering internal threads in the coupling sockets. To obviate the objections of such defective connection, I cut upon each length or section 1 of the tubes or pipes which are to be united in a line or series, at and adjacent to each end of said section, an external screw-thread, 2, which may be either cylindrical or tapered, as preferred, and cut an internal screw-thread, 3, of corresponding pitch and section, in the coupling sockets 4, the socket-threads being without taper if the pipe-threads are cylindrical or but slightly tapered, as in the usual practice; or, if the latter are tapered to any substantial extent, the threads of the socket may be correspondingly tapered from its ends to its center. Each pipe-section is first screwed as tightly as practicable into its socket in the ordinary manner, and after being thus engaged with the socket its threaded surface is forced into close and uniform contact therewith by being expanded into the threads of the socket by the application of pressure to its inner surface for a distance from its end equal to the whole or any desired portion of the length of its thread, such application of pressure forming a slight internal recess or countersink, 5, on the inside of the pipe, corresponding with the increase in its outer diameter in filling the spaces between the threads of the socket.

The expansion of the pipe ends may be effected by any suitable device having the capacity of acting upon one end of a length of pipe while operated from the opposite end thereof, and improvements in mechanism for insuring the ready and effective performance of such operation will constitute the subject-matter of a separate application for Letters Patent by me.

A pipe-coupling formed as above described, so far as the same may embody patentable subject-matter, will also be made the subject of a separate application.

I am aware that the expansion of plain-surfaced tubes by internal pressure within holes or sockets in which they fit loosely and without engagement, as in connecting steam-boiler tubes to their tube-sheets, was known and practiced prior to my invention, and such, therefore, I distinctly disclaim. My invention does not, as in such case, effect connection by the frictional contact of plane surfaces induced by the application of pressure, but combines with a connection effected and maintained by the engagement of helical surfaces, a close and uniform contact of said surfaces produced by subsequently filling any vacant spaces that may be presented between the threads of the connecting member by forcing thereinto the metal of the members which are united thereto and thereby.

It will be observed that as the invention herein described and claimed lies entirely at and through the length of engagement of the threaded surfaces, the interior one of which is expanded, it hence follows that the length or in other respects the form or construction of either member of the joint is immaterial. Consequently I do not limit myself specifically to the making of "pipe-joints," so termed, but include herein the method described in its application to the jointing of known forms of tubes or tubular connections, long or short, having an exteriorly-threaded member screwed at one end into an interiorly-threaded member, and perfected as to the threaded engaging surfaces by the radial expansion of the interior member; and the terms "pipe-section" and "coupling-socket" are used herein in the sense thus indicated.

I claim herein as my invention—

The improvement in the method of coupling pipes, which consists in first effecting the engagement of a pipe-section with a coupling-socket by screwing an external thread upon the pipe-section into an internal thread upon the socket, and thereafter forcing the helical surfaces of the pipe-section and socket into close contact by expanding the thread of the former into the space between the thread-surfaces of the latter by the application of internal pressure, substantially as set forth.

In testimony whereof I have hereunto set my hand.

WILLIAM A. BOLE.

Witnesses:
J. SNOWDEN BELL,
R. H. WHITTLESEY,